United States Patent
Losi et al.

(10) Patent No.: US 9,333,806 B2
(45) Date of Patent: May 10, 2016

(54) HIGH PERFORMANCE RAIN TYRE

(75) Inventors: Piero Losi, Milan (IT); Alfredo Balini, Milan (IT); Maurizio Boiocchi, Milan (IT)

(73) Assignee: PIRELLI TYRE S.P.A., Milan (IT)

( * ) Notice: Subject to any disclaimer, the term of this patent is extended or adjusted under 35 U.S.C. 154(b) by 336 days.

(21) Appl. No.: 13/876,975

(22) PCT Filed: Sep. 27, 2011

(86) PCT No.: PCT/IB2011/054242
§ 371 (c)(1),
(2), (4) Date: Mar. 29, 2013

(87) PCT Pub. No.: WO2012/042468
PCT Pub. Date: Apr. 5, 2012

(65) Prior Publication Data
US 2013/0213540 A1  Aug. 22, 2013

Related U.S. Application Data

(60) Provisional application No. 61/389,465, filed on Oct. 4, 2010.

(30) Foreign Application Priority Data

Sep. 29, 2010  (IT) .............................. PD2010A0289

(51) Int. Cl.
*B60C 11/11* (2006.01)
*B60C 11/03* (2006.01)

(52) U.S. Cl.
CPC ........... *B60C 11/0304* (2013.04); *B60C 11/033* (2013.04); *B60C 2011/0374* (2013.04)

(58) Field of Classification Search
CPC .. B60C 11/0304; B60C 11/033; B60C 11/03; B60C 11/11

USPC ............................... 152/209.8; D12/505–532
See application file for complete search history.

(56) References Cited

U.S. PATENT DOCUMENTS 4,732,194 A * 3/1988 Saneto et al. .............. 152/209.8
4,884,607 A * 12/1989 Mori ........................ 152/209.18
(Continued)

FOREIGN PATENT DOCUMENTS

JP          06-048120      *  2/1994

OTHER PUBLICATIONS

International Search Report from the European Patent Office for International Application No. PCT/IB2011/054242, mailing date Dec. 23, 2011.

(Continued)

*Primary Examiner* — Steven D Maki
*Assistant Examiner* — Robert Dye
(74) *Attorney, Agent, or Firm* — Finnegan, Henderson, Farabow, Garrett & Dunner, L.L.P.

(57) ABSTRACT

A high performance rain tire includes a tread band, having an inner portion and an outer portion as well as a central zone. There are formed in the tread band: two circumferential grooves in the inner portion, a central circumferential groove and a plurality of inner transverse grooves and a plurality of outer transverse grooves, wherein the inner transverse grooves include a central inner section which defines an angle with respect to the equatorial plane of between approximately −95° and approximately −135° and the outer transverse grooves include a central outer section which defines an angle, relative to the equatorial plane, of between approximately +125° and approximately +165°.

60 Claims, 2 Drawing Sheets

(56) References Cited

U.S. PATENT DOCUMENTS

| | | | | |
|---|---|---|---|---|
| 4,962,801 | A | * | 10/1990 | Tsuda ................. B60C 11/0302 152/209.28 |
| 5,054,530 | A | * | 10/1991 | Shiraishi .................. 152/209.28 |
| 5,152,852 | A | * | 10/1992 | Hisamichi et al. ......... 152/209.8 |
| 5,370,168 | A | * | 12/1994 | Boiocchi et al. ........... 152/209.1 |
| 5,702,545 | A | | 12/1997 | Toyoshima et al. |
| D391,535 | S | * | 3/1998 | Johenning et al. ........... D12/514 |
| 6,607,018 | B1 | | 8/2003 | Fukunaga et al. |
| 2006/0151078 | A1 | | 7/2006 | Colombo et al. |
| 2008/0196806 | A1 | * | 8/2008 | Matrascia et al. ....... 152/209.16 |

OTHER PUBLICATIONS

Written Opinion of the International Searching Authority from the European Patent Office for International Application PCT/IB2011/054242, mailing date Dec. 23, 2011.

* cited by examiner

HIGH PERFORMANCE RAIN TYRE

CROSS REFERENCE TO RELATED APPLICATIONS

This application is a national phase application based on PCT/IB2011/054242, filed Sep. 27, 2011, and claims the priority of Italian Patent Application No. PD2010A000289, filed Sep. 29, 2010, and the benefit of U.S. Provisional Application No. 61/389,465, filed Oct. 4, 2010, the content of all of which is incorporated herein by reference.

BACKGROUND OF THE INVENTION

1. Field of the Invention

The present invention relates to a high performance rain tyre which is provided with a tread pattern which is particularly configured to improve the grip of the tyre on wet road surfaces even under conditions of extreme maximum stress, as in the case of use in high-power vehicles and vehicles in motor sport competitions.

2. Description of the Related Art

In order to ensure adequate road holding even on a wet road surface, rain tyres have a tread band which is provided with grooves and notches of various formations and geometries, whose function is to allow the discharge of water present between the surface of the tyre and the road surface at the time of mutual contact, preventing the hydrostatic pressure resulting from the impact of the water against the advancing tyre from being able to cause even partial lifting of the tyre off the road surface and consequent loss of control of the vehicle. This phenomenon, known as aquaplaning, is closely correlated with the speed of the vehicle, so that consideration thereof becomes particularly critical when the tyre is used in vehicles capable of developing high speeds, such as high-powered sports cars or, to an even greater extent, in vehicles used in motor sport competitions.

Although the presence of grooves and notches in the tread on the one hand allows water to be discharged, on the other hand they necessarily reduce the contact surface of the tyre with the road surface, thereby limiting the grip capacity thereof when subjected to braking and acceleration, or when driving round bends.

Therefore, there is an evident need to provide a rain tyre which is provided with a tread pattern which allows the best possible balance to be obtained between the opposing demands set out above, optimizing the number, geometry and formation of grooves and notches.

In the context of the present description and of the appended claims, the following definitions are used.

The term "circumferential groove" is intended to refer to a groove which extends continuously along the entire circumference of the tread in a substantially parallel manner with the equatorial plane and which has a mean width greater than or equal to 8 mm and preferably of between approximately 8 mm and approximately 16 mm and a depth greater than or equal to 3 mm and preferably of between approximately 3 mm and approximately 10 mm.

The term "transverse groove" is intended to refer to a groove which extends, with any path, from a shoulder zone of the tyre towards an equatorial zone of the tyre. In greater detail, a transverse groove may follow any path and may include rectilinear portions with different inclinations and/or curves with variable curvature.

Furthermore, it is intended to be understood that a "groove extends continuously" when the axis thereof follows a continuous curve, that is to say, it does not have any points of discontinuity, with the further distinction that, in the event of intersection with other grooves or notches, the ideal extension of the axes of the two groove portions facing the intersection shall be considered.

It will further be understood that a "groove maintains a constant width" when the width of the groove measured in any cross-section thereof as the distance between the edges which delimit it remains within a range of 10% of a mean value of the width measured over the entire development of the groove. In order to establish that, there are excluded the lateral end zones of the transverse grooves defined in the last 30 mm of the development of the groove, so that in that lateral end zone, generally near the lateral edge of the tread band, the groove may have, for example, a tapered conformation with a progressively smaller width.

The term "subsidiary circumferential notch" is intended to refer to a notch which extends continuously along the entire circumference of the tread in a substantially parallel manner with the equatorial plane and which has a mean width and/or depth less than those indicated in the definition of circumferential groove.

The inclination of a groove portion with respect to an axial direction of the tyre is considered with reference to the acute angle formed by a development direction of that groove portion with the axial direction of the tyre, so that a first groove portion will be considered "greatly inclined with respect to an axial direction of the tyre" with respect to a second groove portion when the acute angle formed by the development direction of the first groove portion with the axial direction of the tyre is greater than the acute angle similarly formed by the development direction of the second groove portion.

However, in order to identify in an unambiguous manner the inclination of any direction defined on the tread of the tyre, there is identified the angle formed by that direction with a half-line lying in the equatorial plane, tangential to the tread and orientated in accordance with the travel direction of the tyre, considering the angles measured in a clockwise direction to be positive.

As a result, therefore, a groove portion becomes more inclined with respect to an axial direction of the tyre the more the angle formed by the development direction thereof with respect to the equatorial plane approaches 0° or ±180° whereas, on the other hand, it becomes less inclined with respect to an axial direction of the tyre the more the angle formed by the development direction thereof with respect to the equatorial plane approaches ±90°.

It may further be set out that the development direction of a groove portion which is necessary for defining the inclination angle thereof coincides with the axis thereof when the portion is substantially rectilinear whilst, when the axis is curved, it is defined by the straight line extending through the end points thereof.

Finally, the term "groove portion" is intended to refer to any groove portion extending over a measurement of more than 20 mm.

Another parameter used in the technical field being referred to for a quantitative evaluation of the presence of a groove in the tread pattern is the "sea-land ratio", a dimensionless number defined as the ratio between the tread surface affected by grooves and notches, and therefore not in abutment with the road surface, and the total surface of the tread.

This parameter may be assessed both over the entire tread and at a specific portion thereof and, in some motor sports competitions such as, for example, Formula 1, is subject to precise regulatory arrangements which, in order to ensure an adequate level of safety for the drivers, set down a minimum value therefore.

SUMMARY OF THE INVENTION

The Applicant has observed that, when driving round bends, the tyre is greatly worn at an outer portion of the tread band owing to the greater loads to which that portion is subjected with respect to an opposite axially inner portion with respect to the equatorial plane of the tyre. This difference in terms of wear involves a corresponding differentiation in the capacity to prevent the phenomenon of aquaplaning over time because the depth of the grooves formed in the outer portion is reduced more rapidly.

Furthermore, the Applicant, having checked that the capacity for adhesion of the tyre to the road surface (grip) is generally correlated with whether or not grooves are present, verified that the grip of the tyre, when driving round bends, is particularly limited by the presence of circumferential grooves in the outer portion of the tread band.

Therefore, the Applicant perceived that, in order to optimize the arrangement and the configuration of both the circumferential and transverse grooves of the tread band so as to balance the opposing requirements involving prevention of aquaplaning and maximizing grip, the function of discharging the water had to be placed mainly on the inner portion of the tread band whilst the function of grip had to be placed mainly on the outer portion thereof.

Finally, the Applicant has found that a rain tyre provided with a tread pattern, in which the circumferential grooves are concentrated in the inner portion of the tread band and in which there are provided transverse grooves in the outer portion which have portions having inclinations which are differentiated with respect to the equatorial plane with a central portion which is more inclined with respect to the axial direction and an end portion which is less inclined, has both a good capacity for discharging water and a good capacity for adhesion to the road surface.

In particular, in a first aspect thereof, the invention relates to a high performance rain tyre comprising a tread band through which an equatorial plane of said tyre extends so as to define:
- an inner portion of said tread band which is intended, in use, to extend towards a support axle of a wheel equipped with said tyre, and an outer portion of said tread band which is arranged axially opposite said inner portion with respect to said equatorial plane, as well as
- a central zone of said tread band which is centred on said equatorial plane and extends over a width of approximately 30% of the total width of said tread band;

there being formed in said tread band:
- at least two circumferential grooves formed in said inner portion,
- at least one central circumferential groove formed in a manner such that its axis is within the central zone,
- a plurality of inner transverse grooves arranged in sequence along the circumference of said tread band, each inner transverse groove extending continuously from said central circumferential groove across said inner portion as far as an inner shoulder zone of said tread band, maintaining a substantially constant width along its length,
- a plurality of outer transverse grooves arranged in sequence along the circumference of said tread band, each outer transverse groove extending continuously from said central circumferential groove across said outer portion as far as an outer shoulder zone of said tread band, maintaining a substantially constant width along its length, wherein:
- at most a single circumferential groove is formed in said outer portion,
- said inner transverse grooves comprise a central inner section in the vicinity of said central circumferential groove and an end inner section extending from said central inner section across said inner shoulder zone, said central inner section extending along a development direction having an inclination relative to an axial direction of said tyre which is greater than the inclination relative to the said axial direction defined by a development direction of said end inner section, the development direction of said central inner section defining an angle, relative to said equatorial plane, of between approximately −95° and approximately −135°,
- said outer transverse grooves comprise a central outer section in the vicinity of said central circumferential groove, and an end outer section extending from said central outer section across said outer shoulder zone, said central outer section extending along a development direction having an inclination relative to the said axial direction which is greater both than the inclination relative to the said axial direction defined by a development direction of said end outer section and than the inclination relative to the said axial direction defined by the development direction of said central inner section, the development direction of said central outer section defining an angle, relative to said equatorial plane, of between approximately +125° and approximately +165°.

The Applicant has verified that, with that configuration, the outer portion of the tread band has optimum performance both in terms of prevention of aquaplaning and in terms of grip, and that those optimum performance levels are further maintained over time.

In particular, owing to that configuration of the tread pattern, the function of drainage of the water is mainly concentrated in the inner portion of the tread band whilst the outer portion, which is affected by circumferential grooves only slightly or not at all, can ensure over time optimum performance levels in terms of road holding. However, the particular configuration of the outer grooves with a central portion substantially inclined with respect to an axial direction of the tyre allows any water present on the road surface to be redirected rapidly and efficiently, ensuring the necessary capacity for discharging the water even at the outer portion of the tread band.

The rapid discharge of the water is further promoted by the fact that the transverse grooves, in particular the outer grooves, are continuous and have a substantially constant width, so as not to create artificial obstacles and brakes with respect to the outflow of water.

The present invention, in the above aspect, may have at least one of the preferred features set out below.

Preferably, said inner transverse grooves and said outer transverse grooves open into said central circumferential groove in axially opposite positions.

According to a preferred feature, said central circumferential groove is formed in said inner portion.

This advantageously allows a greater concentration of the function involving discharge of water, and therefore prevention of the phenomenon of aquaplaning, at the inner portion of the tyre, allowing the outer portion to be safeguarded more significantly in terms of resistance to wear and grip.

In an embodiment of the invention, one single circumferential groove is formed in said outer portion.

In an alternative preferred embodiment, there are no circumferential grooves formed in said outer portion.

In that manner, it is possible to design the outer portion of the tread and to promote the aspect of grip and wear resistance so as to adapt the tyre to various performance requirements and therefore to different types of vehicle.

Preferably, a single subsidiary circumferential notch, the mean width of which is greater than or equal to approximately 3 mm and less than approximately 8 mm, is formed in said outer portion.

The provision of a subsidiary circumferential notch in the outer portion may represent an effective compromise between the opposing demands of discharging water and maintaining road holding over time, particularly when driving round bends.

According to another feature, the central circumferential groove has a greater width than the other circumferential grooves that are formed in the tread.

Preferably, the width of said central circumferential groove is between approximately 110% and approximately 140% of the width of the remaining circumferential grooves.

In that manner, the greater draining effect is concentrated in the central zone of the tread band where it is more probable and dangerous for the phenomenon of aquaplaning to be triggered.

In an embodiment of the invention, the end inner section and the end outer section extend as far as the respective axial extremities of the tread band.

This advantageously allows the water present in the transverse grooves to be discharged more accurately and efficiently.

Preferably, the central outer section is connected to the central circumferential groove by a curved portion which intersects the central circumferential groove along a direction forming an angle, relative to the equatorial plane, of between approximately +80° and approximately +100°. With this type of connection, whilst maintaining the fluid communication, the exchange of flows of water is not facilitated between the outer transverse groove and the central circumferential groove. This allows a reduction in turbulence and limits on the influx of water from the central circumferential groove which, being channeled in the outer transverse groove, would reduce the capacity thereof for receiving the water present in the region of the road surface directly under the outer portion of the tread band.

According to a preferred feature of the invention, the end outer section extends along a development direction defining an angle, relative to the equatorial plane, of between approximately +55° and approximately +95°.

Furthermore, preferably, the end inner section extends along a development direction defining an angle, relative to the equatorial plane, of between approximately −80° and approximately −100°.

In that manner, at the axial ends of the tread band, the grooves have a very low inclination with respect to an axial direction of the tyre, with this maximizing the performance levels in terms of road holding when the vehicle is being driven round bends.

In one embodiment of the invention, the inclination relative to the axial direction at which the central inner section intersects said central circumferential groove is the maximum inclination of said inner transverse groove relative to said axial direction.

Furthermore, preferably, the central inner section is curved progressively from said central circumferential groove as far as its connection with said end inner section.

In that manner, the discharge of water present in the central circumferential groove is also promoted via the inner transverse groove.

In a preferred embodiment, the inner portion has a sea-land ratio of between approximately 30 and approximately 50.

Furthermore, preferably, the outer portion has a sea-land ratio of between approximately 25 and approximately 45.

There is thereby ensured adequate balance between the demands involving drainage of water and road holding, at the same time also complying with the safety standards which govern the most important motor sport competitions.

According to a preferred feature of the invention, the inner transverse grooves and the outer transverse grooves have substantially the same width.

In a preferred manner, the inner transverse grooves and the outer transverse grooves have a width of between approximately 4 mm and approximately 14 mm.

In a greatly preferred manner, the inner transverse grooves and the outer transverse grooves have a width of between approximately 7 mm and approximately 10 mm.

In a preferred form of the invention, the outer transverse grooves extend over a portion of tread having a width of between approximately 50% and approximately 65% of the overall width of the tread band.

Preferably, the end outer section extends over a portion of tread band having a width of between approximately 15% and approximately 35% of the overall width of the tread band.

Preferably, the central outer section extends over a tread band portion having a width of between approximately 5% and approximately 20% of the overall width of the tread band.

Preferably, the end inner section extends over a tread band portion having a width of between approximately 5% and approximately 20% of the overall width of the tread band.

Preferably, the central inner section extends over a tread band portion having a width of between approximately 15% and approximately 35% of the overall width of the tread band.

With the above-mentioned dimensional proportions between the various transverse groove sections, the best balance between the various demands mentioned above in terms of drainage and road holding is obtained.

In a preferred form of the invention, each pair of adjacent outer transverse grooves is connected by a first notch formed in the tread band.

In that manner, the fluid communication between adjacent outer transverse grooves is promoted with resultant more uniform distribution of the water at the outer portion of the tread.

In a preferred manner, each first notch is arranged in a condition of non-alignment with the corresponding first notches provided between adjacent pairs of outer transverse grooves.

It is thereby prevented that the notches can define, successively, a notch continuously in a direction which is at least partially circumferential around the tread band.

Preferably, the first notches extend between end outer sections of said adjacent outer transverse grooves.

In a greatly preferred manner, the first notch extends along a substantially perpendicular direction to the said end outer sections.

This advantageously allows minimizing of the length of the first notch and consequently also the resistance to flow of water between adjacent outer transverse grooves.

In another preferred form of the invention, each pair of adjacent central outer sections is connected by a second notch formed in said tread band.

In that manner, the hydrodynamic exchange between adjacent outer transverse grooves is further improved.

Preferably, each second notch is arranged in a condition of non-alignment with the corresponding second notches provided between adjacent pairs of transverse grooves.

In that case, there is also obtained the advantage of preventing the succession of second notches from being able to define a notch extending continuously in a direction which is at least partially circumferential around the tread band.

In a greatly preferred manner, the second notches extend along an axis substantially perpendicular to the central outer sections.

In that manner, there is obtained the additional advantage of preventing possible damage or actual fissures in the tread band portion between adjacent central outer sections which may potentially be caused by shear stress applied to the tread surface during powerful accelerations or decelerations round bends.

In a preferred form of the invention, the first notches and the second notches have a width of between approximately 6 mm and approximately 12 mm.

Preferably, the first notches and the second notches have substantially the same width.

According to another preferred feature of the invention, the outer transverse grooves and the inner transverse grooves have a depth of between approximately 3 mm and approximately 10 mm.

BRIEF DESCRIPTION OF THE DRAWINGS

The features and advantages of the invention will be better appreciated from the detailed description of a preferred embodiment thereof, given purely by way of non-limiting example with reference to the appended drawings, in which.

Figure 1:
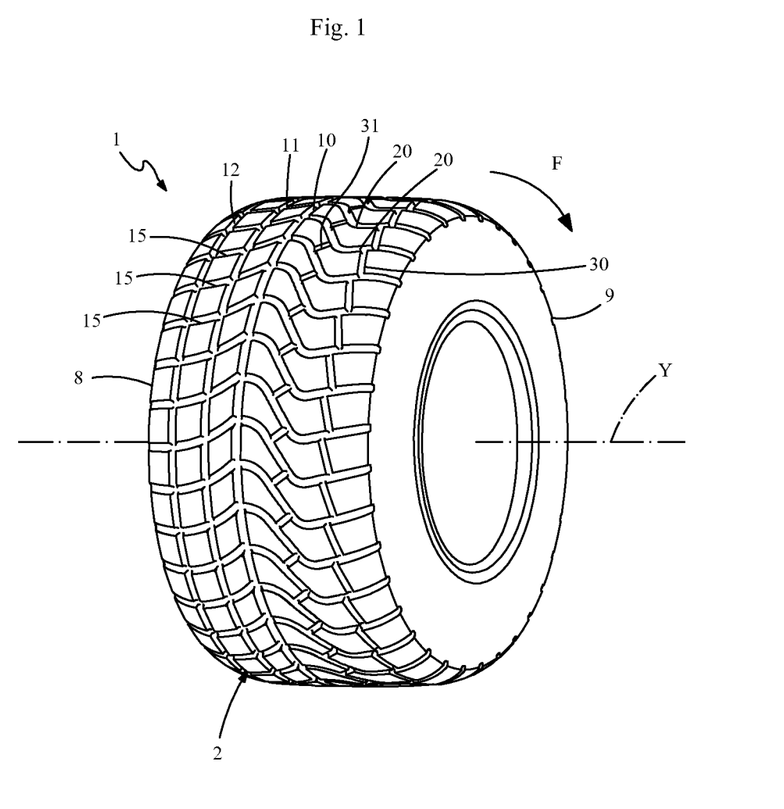
FIG. 1 is a perspective view of a rain tyre constructed in accordance with the present invention.
Figure 2:
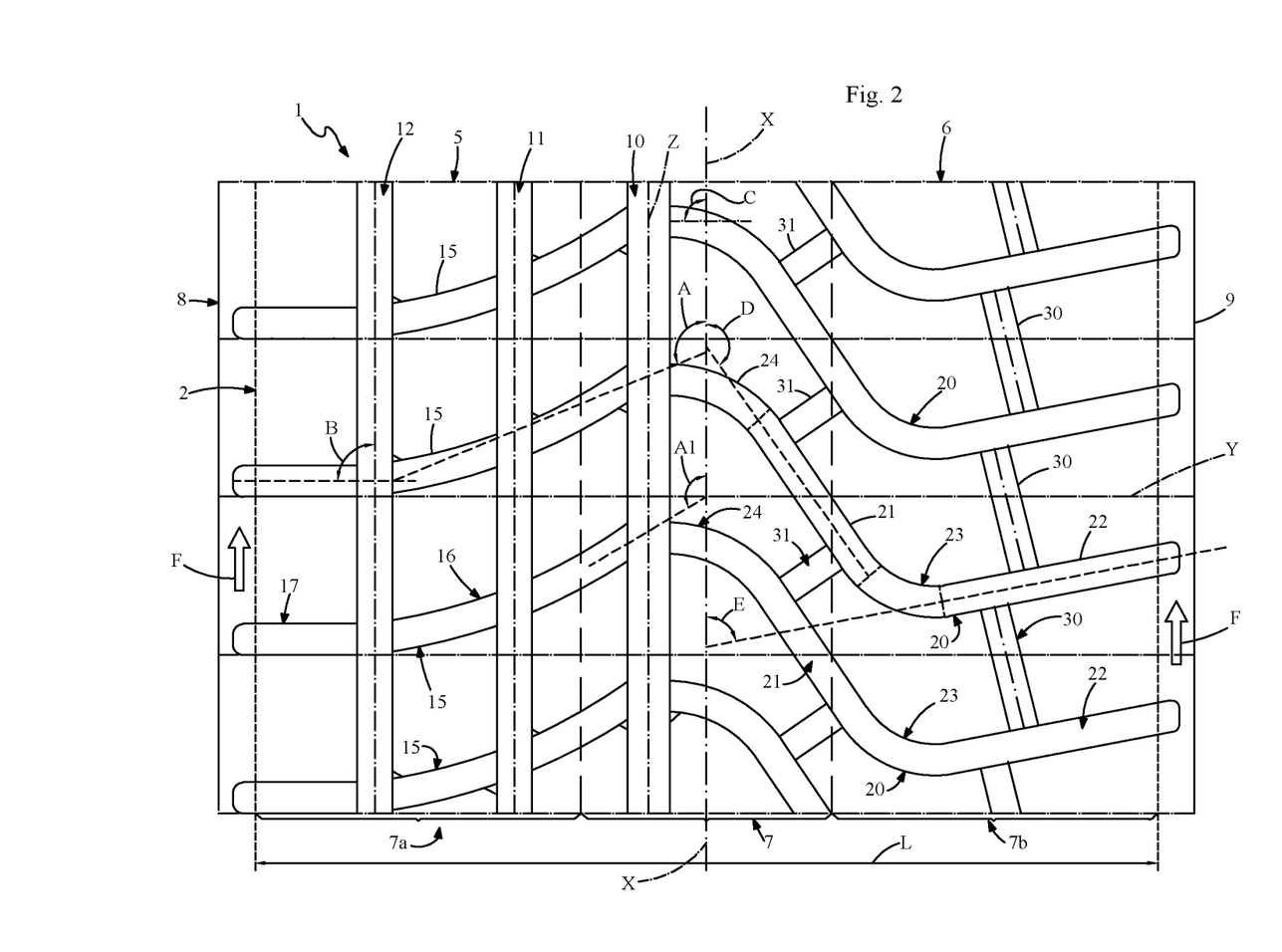
FIG. 2 is a schematic view of the development in a plane of a significant region of the tread band of the tyre of FIG. 1.

With reference to the appended Figures, there is generally designated 1 a rain tyre constructed in accordance with the present invention.

DETAILED DESCRIPTION OF THE INVENTION

The tyre 1 has a conventional form which is generally toroidal and developed about an axis of rotation, defining an axial direction Y of the tyre, and through which an equatorial plane X, substantially perpendicular to the axial direction Y, extends.

The tyre 1 comprises a tyre structure which is conventional per se and which is not illustrated in the appended Figures, as well as a tread band 2 which is arranged in a radially outer position with respect to the tyre 1 and which is intended for contact with a road surface 3, schematically illustrated in FIG. 1.

There are defined on the tread band 2 an inner portion 5 of the tread band which is intended, during use, to be directed towards a support axle of a wheel which is provided with the tyre 1 and an outer portion 6 of the tread band 2, which is axially opposite the inner portion 5 with respect to the equatorial plane X and which is separated therefrom by the equatorial plane X.

The inner portions 5 and outer portions 6 are delimited, at the side opposite the equatorial plane X, by respective inner and outer axial ends which are designated 8 and 9, respectively.

With reference to FIG. 2, it may be set out that, by referring that drawing to a development in a plane of a generally curved surface, the axial ends 8 and 9 of the tread are displaced further inwards with respect to the drawn sides which, in the real configuration of the tread, are curved towards the lateral side of the tyre.

Furthermore, there is defined on the tread 2 a central zone 7 which is centred on the equatorial plane X and which extends over a width equal to approximately 30% of the total width L of the tread band 2, defined as the distance between the axial ends 8 and 9, as well as an inner shoulder zone 7a and an outer shoulder zone 7b which are arranged at axially opposing sides with respect to the central zone 7 and which each extend over a width equal to approximately 35% of the total width L. Merely by way of example, the three above-mentioned zones are delimited by broken lines in FIG. 2.

There are formed on the tread band 2 a plurality of grooves and notches, which generally form the tread pattern of the tyre 1 which allows the tyre 1 to discharge the water which may be present on the road surface 3 and to maintain adequate road holding.

The particular configuration of the tread pattern of the tyre 1 according to the present invention makes the tyre 1 of the unidirectional type in the sense that the assembly of the tyre must ensure, during normal travel of the vehicle, the rotation thereof in a predetermined direction. In FIG. 2, there is designated F the direction of travel of the vehicle when the tread 2 is viewed from above. Therefore, with the inner and outer portions of the tread and the direction of travel F being defined, it will be appreciated that the tyre 1 is provided to be mounted on the right-hand side of the vehicle whilst the corresponding left-hand tyre would have a tread pattern which is specularly symmetrical thereto.

Examining the tread pattern in detail, there is formed on the tread band 2 a central circumferential groove 10 whose axis Z is within the central zone 7 and two circumferential grooves 11 and 12 which are completely formed inside the inner portion 5 arranged in a substantially equidistant position between the central circumferential groove 10 and the inner axial end 8 of the tread band 2.

The central circumferential groove has a mean width of between approximately 10 mm and approximately 16 mm, preferably of approximately 12 mm. The circumferential grooves 11 and 12 have mean widths which are equal to each other and less than that of the central circumferential groove 10, between approximately 8 mm and approximately 14 mm, preferably of approximately 10 mm.

All the circumferential grooves further have the same depth of between approximately 3 mm and approximately 10 mm, preferably of approximately 5 mm.

In the preferred embodiment described here in detail, all the circumferential grooves formed on the tread band 2, including the central circumferential groove 10, lie at an axially inner side with respect to the equatorial axis X. In alternative construction variants which are not illustrated in the appended drawings, however, it is provided that the central circumferential groove 10 be centred on the equatorial plane X or that a circumferential groove also be formed at the outer portion 6 or, alternatively, that in this latter a subsidiary circumferential notch, whose mean width is preferably greater than or equal to approximately 3 mm and less than or equal to approximately 8 mm, with a depth of between approximately 3 mm and 10 mm, be formed. There is further formed on the tread band 2 a plurality of inner transverse grooves, which are all designated 15, are preferably equal to each other and are arranged in succession, in accordance with predefined spacing, along the circumference of the tread band 2.

Each inner transverse groove 15 extends continuously from the central circumferential groove 10 along the inner portion 5, extending through the inner shoulder zone 7a and intersecting with the circumferential grooves 11 and 12, and reaches as far as the inner axial end 8, maintaining a substantially constant width over the length thereof. Each inner transverse groove 15 comprises a central inner section 16 which extends from the central circumferential groove 10 intersecting with the circumferential groove 11 in order to reach as far as the circumferential groove 12, and an end inner section 17 which extends, in continuation of the central inner section 16, from the circumferential groove 12, via the inner shoulder zone 7a as far as the inner axial end 8.

Each inner transverse groove 15 has a curved development with inclination in relation to the axial direction Y, gradually decreasing from the central circumferential groove 10 as far as the inner axial end 8.

The inclination with respect to the axial direction Y of the inner transverse groove 15 is therefore at a maximum in the region of the intersection thereof with the central circumferential groove 10 and at a minimum in the region of the inner axial end 8 whilst the inclination with respect to the axial direction Y of the central inner section 16 is always greater than the inclination of the end inner section 17.

In particular, the development direction of the central inner section 16 defines an angle A with respect to the equatorial plane X of between approximately −95° and approximately −135°, preferably of between approximately −110° and approximately −120°; with an angle A1 in the region of the intersection with the central circumferential groove 10 of between approximately −105° and approximately −145°, preferably of between approximately −120° and approximately −130°.

The development direction of the end inner section 17 defines in turn an angle B with respect to the equatorial plane X of between approximately −80° and approximately −100°, preferably of approximately −90°.

In a similar manner, there is further formed on the tread band 2 a plurality of outer transverse grooves, which are all designated 20, are preferably equal to each other and are arranged successively in accordance with predefined spacings, along the circumference of the tread band 2.

Each outer transverse groove 20 extends continuously from the central circumferential groove 10 along the outer portion 6 and, via the outer shoulder zone 7b, reaches as far as the outer axial end 9, maintaining a substantially constant width along the length thereof.

Each outer transverse groove 20 comprises a central outer section 21 which is near the central circumferential groove 10 and which extends through the central zone 7, as well as an end outer section 22 which extends in continuation of the central outer section 21 and which is connected thereto by means of a first curved section 23, extending through the outer shoulder zone 7b as far as the outer axial end 9.

The central outer section 21 is connected to the central circumferential groove 10 by a second curved section 24 which intersects with the central circumferential groove 10 in a direction defining an angle C with respect to the equatorial plane X between approximately +80° and approximately +100° and preferably of approximately +90°.

The second curved section 24 opens in the central circumferential section 10 in a position facing the opening of a corresponding central inner section 16 so that the inner transverse grooves 15 and the outer transverse grooves 20 are open in relation to the central circumferential groove 10 in an axially opposite position.

The inclination with respect to the axial direction Y of the central outer section 21 is greater than both the inclination of the end outer section 22 and the central inner section 16.

In particular, the development direction of the central outer section 21 defines an angle D with respect to the equatorial plane X of between approximately +125° and approximately +165°, preferably of between approximately +140° and approximately +150°. The development direction of the end outer section 22 defines an angle E with respect to the equatorial plane X of between approximately +55° and approximately +95°, preferably of between approximately +70° and approximately +80°.

The inner transverse grooves 15 and the outer transverse grooves 20 have substantially the same mean width of between approximately 4 mm and approximately 14 mm, preferably of between approximately 7 mm and approximately 10 mm, in a greatly preferred manner of approximately 8.5 mm, and the same depth of between approximately 3 mm and approximately 10 mm, preferably of approximately 5 mm.

First and second notches 30 and 31 extend between pairs of adjacent outer transverse grooves 20.

The first notches 30 extend between adjacent outer transverse grooves 20 in the region of the end outer sections 22, respectively, whilst the second notches 31 extend between adjacent outer transverse grooves 20 in the region of the central outer sections 21, respectively.

The first and second notches 30, 31 have substantially the same width, preferably a width between approximately 6 mm and approximately 12 mm.

The first notches 30 extend in a substantially perpendicular direction relative to the end outer sections 22 and are arranged in a mutual condition of non-alignment with the other first notches.

Similarly, the second notches 31 also extend in a substantially perpendicular direction relative to the central outer sections 21 and are arranged in a mutual condition of non-alignment with the other second notches.

The outer transverse notches 20 extend over a portion of tread band 2 having a width of between approximately 50% and approximately 65% of the total width L thereof. In greater detail, the end outer section 22 extends over a width of between approximately 15% and approximately 35% of the width L, whilst the central outer section 21 extends over a width of between approximately 5% and approximately 20% of the width L.

In turn, the inner transverse grooves 15 extend over a portion of tread band 2 having a width of between approximately 35% and approximately 50% of the total width L thereof. In greater detail, the end inner section 17 extends over a width of between approximately 5% and approximately 20% of the width L, whilst the central inner section 16 extends over a width of between approximately 15% and approximately 35% of the width L.

As a result of the tread pattern described above, the inner portion 5 has a sea-land ratio of between approximately 30 and approximately 50. The outer portion 6 has a sea-land ratio of between approximately 25 and approximately 45.

The invention claimed is:

1. A high performance rain tyre comprising a tread band through which an equatorial plane of said tyre extends so as to define:
   an inner portion of said tread band which is intended, in use, to extend toward a support axle of a wheel equipped with said tyre, and an outer portion of said tread band which is arranged axially opposite said inner portion with respect to said equatorial plane; and
   a central zone of said tread band which is centered on said equatorial plane and extends over a width of approximately 30% of the total width of said tread band, there being formed in said tread band:
- at least two circumferential grooves formed in said inner portion;
- at least one central circumferential groove distinct from said at least two circumferential grooves formed in said inner portion, said central circumferential groove being formed in a manner such that an axis thereof is within the central zone;
- a plurality of inner transverse grooves arranged in sequence along a circumference of said tread band, each inner transverse groove extending continuously from said central circumferential groove across said inner portion as far as an inner shoulder zone of said tread band, maintaining a substantially constant width along a length thereof;
- a plurality of outer transverse grooves arranged in sequence along the circumference of said tread band, each outer transverse groove extending continuously from said central circumferential groove across said outer portion as far as an outer shoulder zone of said tread band, maintaining a substantially constant width along a length thereof, wherein:
- at most a single circumferential groove, distinct from said at least two circumferential grooves formed in said inner portion and said at least one central circumferential groove, is formed in said outer portion,
- said inner transverse grooves comprise a central inner section in a vicinity of said central circumferential groove and an end inner section extending from said central inner section across said inner shoulder zone, said central inner section extending along a development direction having an inclination relative to an axial direction of said tyre which is greater than the inclination relative to said axial direction defined by a development direction of said end inner section, the development direction of said central inner section defining an angle, relative to said equatorial plane, of between approximately −95° and approximately −135°,
- said outer transverse grooves comprise a central outer section in a vicinity of said central circumferential groove, and an end outer section extending from said central outer section across said outer shoulder zone, said central outer section extending along a development direction having an inclination relative to said axial direction which is greater both than the inclination relative to said axial direction defined by a development direction of said end outer section and the inclination relative to said axial direction defined by the development direction of said central inner section, the development direction of said central outer section defining an angle, relative to said equatorial plane, of between approximately +125° and approximately +165°,
- each respective adjacent pair of said plurality of outer transverse grooves is connected by a first notch formed in said tread band between said end outer sections of said adjacent outer transverse grooves,
- each first notch is arranged in a condition of non-alignment with corresponding first notches provided between adjacent pairs of outer transverse grooves, and
- each first notch extends along a substantially perpendicular direction to said end outer sections.

2. The tyre according to claim 1, wherein said inner transverse grooves and said outer transverse grooves open into said central circumferential groove in axially opposite position.

3. The tyre according to claim 1, wherein said central circumferential groove is formed in said inner portion.

4. The tyre according to claim 1, wherein one circumferential groove, distinct from said at least two circumferential grooves formed in said inner portion and said at least one central circumferential groove, is formed in said outer portion.

5. The tyre according to claim 1, wherein no circumferential groove, distinct from said at least two circumferential grooves formed in said inner portion and said at least one central circumferential groove, is formed in said outer portion.

6. The tyre according to claim 1, wherein a single subsidiary circumferential notch, the width of which is greater than or equal to approximately 3 mm and less than approximately 8 mm, is formed in said outer portion.

7. The tyre according to claim 1, wherein said central circumferential groove has a greater width than the other circumferential grooves which are formed in said tread band.

8. The tyre according to claim 7, wherein the width of said central circumferential groove is between approximately 110% and approximately 140% of the width of the remaining circumferential grooves.

9. The tyre according to claim 1, wherein said end inner section and said end outer section extend as far as respective axial extremities of said tread band.

10. The tyre according to claim 1, wherein said central outer section is connected to said central circumferential groove by a curved portion which intersects said central circumferential groove along a direction forming an angle, relative to said equatorial plane, of between approximately +80° and approximately +100°.

11. The tyre according to claim 1, wherein said end outer section extends along a development direction defining an angle, relative to said equatorial plane, of between approximately +55° and approximately +95°.

12. The tyre according to claim 1, wherein said end inner section extends along a development direction defining an angle, relative to said equatorial plane, of between approximately −80° and approximately −100°.

13. The tyre according to claim 1, wherein the inclination relative to said axial direction at which said central inner section intersects said central circumferential groove is a maximum inclination of said inner transverse groove relative to said axial direction.

14. The tyre according to claim 1, wherein said central inner section is curved progressively from said central circumferential groove as far as its connection with said end inner section.

15. The tyre according to claim 1, wherein said inner portion has a sea-land ratio of between approximately 30 and approximately 50.

16. The tyre according to claim 1, wherein said outer portion has a sea-land ratio of between approximately 25 and approximately 45.

17. The tyre according to claim 1, wherein said inner transverse grooves and said outer transverse grooves have substantially the same width.

18. The tyre according to claim 1, wherein said inner transverse grooves and said outer transverse grooves have a width of between 4 mm and 14 mm.

19. The tyre according to claim 1, wherein said outer transverse grooves extend over a portion of tread band having a width of between approximately 50% and approximately 65% of an overall width of said tread band.

20. The tyre according to claim 1, wherein said end outer section extends over a portion of tread band having a width of between approximately 15% and approximately 35% of an overall width of said tread band.

21. The tyre according to claim 1, wherein said central outer section extends over a tread band portion having a width of between approximately 5% and approximately 20% of an overall width of said tread band.

22. The tyre according to claim 1, wherein said end inner section extends over a tread band portion having a width of between approximately 5% and approximately 20% of an overall width of said tread band.

23. The tyre according to claim 1, wherein said central inner section extends over a tread band portion having a width of between approximately 15% and approximately 35% of an overall width of said tread band.

24. The tyre according to claim 1, wherein each pair of adjacent central outer sections is connected by a second notch formed in said tread band.

25. The tyre according to claim 24, wherein each second notch is arranged in a condition of non-alignment with corresponding second notches provided between adjacent pairs of transverse grooves.

26. The tyre according to claim 25, wherein said first notches and second notches have a width of between approximately 6 mm and approximately 12 mm.

27. The tyre according to claim 26, wherein said first notches and second notches have substantially a same width.

28. The tyre according to claim 1, wherein said outer transverse grooves and said inner transverse grooves have a depth of between approximately 3 mm and approximately 10 mm.

29. A high performance rain tyre comprising a tread band through which an equatorial plane of said tyre extends so as to define:
an inner portion of said tread band which is intended, in use, to extend toward a support axle of a wheel equipped with said tyre, and an outer portion of said tread band which is arranged axially opposite said inner portion with respect to said equatorial plane; and
a central zone of said tread band which is centered on said equatorial plane and extends over a width of approximately 30% of the total width of said tread band, there being formed in said tread band:
at least two circumferential grooves formed in said inner portion;
at least one central circumferential groove distinct from said at least two circumferential grooves formed in said inner portion, said central circumferential groove being formed in a manner such that an axis thereof is within the central zone;
a plurality of inner transverse grooves arranged in sequence along a circumference of said tread band, each inner transverse groove extending continuously from said central circumferential groove across said inner portion as far as an inner shoulder zone of said tread band, maintaining a substantially constant width along a length thereof;
a plurality of outer transverse grooves arranged in sequence along the circumference of said tread band, each outer transverse groove extending continuously from said central circumferential groove across said outer portion as far as an outer shoulder zone of said tread band, maintaining a substantially constant width along a length thereof, wherein:
at most a single circumferential groove, distinct from said at least two circumferential grooves formed in said inner portion and said at least one central circumferential groove, is formed in said outer portion,
said inner transverse grooves comprise a central inner section in a vicinity of said central circumferential groove and an end inner section extending from said central inner section across said inner shoulder zone, said central inner section extending along a development direction having an inclination relative to an axial direction of said tyre which is greater than the inclination relative to said axial direction defined by a development direction of said end inner section, the development direction of said central inner section defining an angle, relative to said equatorial plane, of between approximately −95° and approximately −135°,
said outer transverse grooves comprise a central outer section in a vicinity of said central circumferential groove, and an end outer section extending from said central outer section across said outer shoulder zone, said central outer section extending along a development direction having an inclination relative to said axial direction which is greater both than the inclination relative to said axial direction defined by a development direction of said end outer section and the inclination relative to said axial direction defined by the development direction of said central inner section, the development direction of said central outer section defining an angle, relative to said equatorial plane, of between approximately +125° and approximately +165°,
each respective adjacent pair of said plurality of outer transverse grooves is connected by a first notch formed in said tread band between said end outer sections of said adjacent outer transverse grooves,
each first notch is arranged in a condition of non-alignment with corresponding first notches provided between adjacent pairs of outer transverse grooves,
each pair of adjacent central outer sections is connected by a second notch formed in said tread band, each second notch being arranged in a condition of non-alignment with corresponding second notches provided between adjacent pairs of transverse grooves, and
the second notches extend along a substantially perpendicular direction to said central outer sections.

30. The tyre according to claim 29, wherein said inner transverse grooves and said outer transverse grooves open into said central circumferential groove in axially opposite position.

31. The tyre according to claim 29, wherein said central circumferential groove is formed in said inner portion.

32. The tyre according to claim 29, wherein one circumferential groove, distinct from said at least two circumferential grooves formed in said inner portion and said at least one central circumferential groove, is formed in said outer portion.

33. The tyre according to claim 29, wherein no circumferential groove, distinct from said at least two circumferential grooves formed in said inner portion and said at least one central circumferential groove, is formed in said outer portion.

34. The tyre according to claim 29, wherein said central circumferential groove has a greater width than the other circumferential grooves which are formed in said tread band.

35. The tyre according to claim 29, wherein said end inner section and said end outer section extend as far as respective axial extremities of said tread band.

36. The tyre according to claim 29, wherein said central outer section is connected to said central circumferential groove by a curved portion which intersects said central circumferential groove along a direction forming an angle, relative to said equatorial plane, of between approximately +80° and approximately +100°.

37. The tyre according to claim 29, wherein said end outer section extends along a development direction defining an angle, relative to said equatorial plane, of between approximately +55° and approximately +95°.

38. The tyre according to claim 29, wherein said end inner section extends along a development direction defining an angle, relative to said equatorial plane, of between approximately −80° and approximately −100°.

39. The tyre according to claim 29, wherein the inclination relative to said axial direction at which said central inner section intersects said central circumferential groove is a maximum inclination of said inner transverse groove relative to said axial direction.

40. The tyre according to claim 29, wherein said central inner section is curved progressively from said central circumferential groove as far as its connection with said end inner section.

41. The tyre according to claim 29, wherein said inner transverse grooves and said outer transverse grooves have substantially the same width.

42. The tyre according to claim 29, wherein said first notches and second notches have a width of between approximately 6 mm and approximately 12 mm.

43. The tyre according to claim 42, wherein said first notches and second notches have substantially a same width.

44. The tyre according to claim 29, wherein said outer transverse grooves and said inner transverse grooves have a depth of between approximately 3 mm and approximately 10 mm.

45. A high performance rain tyre comprising a tread band through which an equatorial plane of said tyre extends so as to define:
    an inner portion of said tread band which is intended, in use, to extend toward a support axle of a wheel equipped with said tyre, and an outer portion of said tread band which is arranged axially opposite said inner portion with respect to said equatorial plane; and
    a central zone of said tread band which is centered on said equatorial plane and extends over a width of approximately 30% of the total width of said tread band, there being formed in said tread band:
    at least two circumferential grooves formed in said inner portion;
    at least one central circumferential groove distinct from said at least two circumferential grooves formed in said inner portion, said central circumferential groove being formed in a manner such that an axis thereof is within the central zone;
    a plurality of inner transverse grooves arranged in sequence along a circumference of said tread band, each inner transverse groove extending continuously from said central circumferential groove across said inner portion as far as an inner shoulder zone of said tread band, maintaining a substantially constant width along a length thereof;
    a plurality of outer transverse grooves arranged in sequence along the circumference of said tread band, each outer transverse groove extending continuously from said central circumferential groove across said outer portion as far as an outer shoulder zone of said tread band, maintaining a substantially constant width along a length thereof, wherein:
    one circumferential groove, distinct from said at least two circumferential grooves formed in said inner portion and said at least one central circumferential groove, is formed in said outer portion,
    said inner transverse grooves comprise a central inner section in a vicinity of said central circumferential groove and an end inner section extending from said central inner section across said inner shoulder zone, said central inner section extending along a development direction having an inclination relative to an axial direction of said tyre which is greater than the inclination relative to said axial direction defined by a development direction of said end inner section and the development direction of said central inner section defining an angle, relative to said equatorial plane, of between approximately −95° and approximately −135°,
    said outer transverse grooves comprise a central outer section in a vicinity of said central circumferential groove, and an end outer section extending from said central outer section across said outer shoulder zone, said central outer section extending along a development direction having an inclination relative to said axial direction which is greater both than the inclination relative to said axial direction defined by a development direction of said end outer section and the inclination relative to said axial direction defined by the development direction of said central inner section, the development direction of said central outer section defining an angle, relative to said equatorial plane, of between approximately +125° and approximately +165°.

46. The tyre according to claim 45, wherein said inner transverse grooves and said outer transverse grooves open into said central circumferential groove in axially opposite position.

47. The tyre according to claim 45, wherein said central circumferential groove is formed in said inner portion.

48. The tyre according to claim 45, wherein one circumferential groove, distinct from said at least two circumferential grooves formed in said inner portion and said at least one central circumferential groove, is formed in said outer portion.

49. The tyre according to claim 45, wherein no circumferential groove, distinct from said at least two circumferential grooves formed in said inner portion and said at least one central circumferential groove, is formed in said outer portion.

50. The tyre according to claim 45, wherein said central circumferential groove has a greater width than the other circumferential grooves which are formed in said tread band.

51. The tyre according to claim 45, wherein said end inner section and said end outer section extend as far as respective axial extremities of said tread band.

52. The tyre according to claim 45, wherein said central outer section is connected to said central circumferential groove by a curved portion which intersects said central circumferential groove along a direction forming an angle, relative to said equatorial plane, of between approximately +80° and approximately +100°.

53. The tyre according to claim 45, wherein said end outer section extends along a development direction defining an angle, relative to said equatorial plane, of between approximately +55° and approximately +95°.

54. The tyre according to claim 45, wherein said end inner section extends along a development direction defining an angle, relative to said equatorial plane, of between approximately −80° and approximately −100°.

55. The tyre according to claim 45, wherein the inclination relative to said axial direction at which said central inner section intersects said central circumferential groove is a maximum inclination of said inner transverse groove relative to said axial direction.

56. The tyre according to claim 45, wherein said central inner section is curved progressively from said central circumferential groove as far as its connection with said end inner section.

57. The tyre according to claim 45, wherein said inner transverse grooves and said outer transverse grooves have substantially the same width.

58. The tyre according to claim 45, wherein:
- each respective adjacent pair of said plurality of outer transverse grooves is connected by a first notch formed in said tread band between said end outer sections of said adjacent transverse grooves,
- each pair of adjacent central outer sections is connected by a second notch formed in said tread band, and
- said first notches and said second notches have a width of between approximately 6 mm and approximately 12 mm.

59. The tyre according to claim 58, wherein said first notches and second notches have substantially a same width.

60. The tyre according to claim 45, wherein said outer transverse grooves and said inner transverse grooves have a depth of between approximately 3 mm and approximately 10 mm.

\* \* \* \* \*